Dec. 26, 1922.                                                           1,439,974.
W. J. W. ORR.
POLE SPLICER AND TREE LIMB SUPPORTER.
FILED DEC. 18, 1920.

Inventor
William J. W. Orr.

Patented Dec. 26, 1922.

1,439,974

UNITED STATES PATENT OFFICE.

WILLIAM J. W. ORR, OF LOS ANGELES, CALIFORNIA.

POLE SPLICER AND TREE-LIMB SUPPORTER.

Application filed December 18, 1920. Serial No. 431,658.

*To all whom it may concern:*

Be it known that I, WILLIAM J. W. ORR, a citizen of the United States, residing at Los Angeles, in the county of Los Angeles and State of California, have invented new and useful Improvements in Pole Splicers and Tree-Limb Supporters, of which the following is a specification.

My invention relates to pole splicers, and is particularly adapted to be used for the splicing together of poles of short lengths to form a rigid pole of a desired long length, whereby a number of short length poles may be easily handled, and conveniently transported to their destination, and quickly and efficiently joined together to form tent poles or tree limb supporters, or for any other desired purpose. My splicer may also be very advantageously and economically used for the joining together of short lengths of expensive timber used in building construction, or where it is desired to cut out the knots and split parts of said timber and utilize the sound parts thereof to form a long timber.

A further and important object of my invention is to provide a device which when applied to the end of a pole or other suitable support may be used in supporting tree limbs in position, and thereby prevent accidental breakage of the limbs from trees when they become heavily ladened with ripened fruit.

I accomplish the above objects by means of the device described herein, and illustrated in the accompanying drawings, in which.

Figure 1:
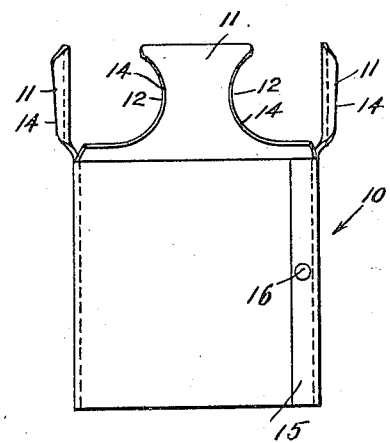
Fig. 1 is a side view of my invention.

My splicing device comprises a sleeve 10 preferably formed of a single piece of sheet metal and preferably rectangular in cross section. Formed on one end of the sleeve 10 is a plurality of prongs 11, which are bent outwardly from and extend approximately parallel with the walls of said sleeve.

The prongs 11 are provided with the inwardly curved notches 12 on their opposed edges, adapted to receive a guy rope or tree supporting rope (not shown). The prongs 11 are provided with strengthening ribs 14 at their side edges, as clearly shown in Fig. 2 of the drawings. The body portion of sleeve 10 is formed in the shape of a rectangle and the ends of the metal forming said rectangle are arranged to overlap as at 15, and are secured together by means of a rivet 16.

Figure 2:
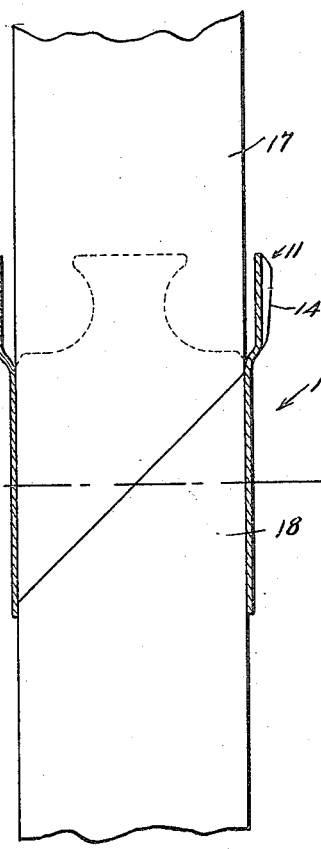
Fig. 2 is a longitudinal section through my device, showing its application to form a juncture between a pair of pole members.
Figure 3:
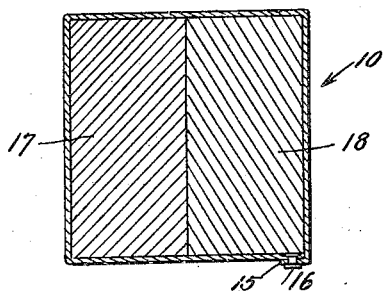
Fig. 3 is a transverse section through the device and a pair of pole members, taken on the line 3—3 of Fig. 2.

In utilizing my splicing device, it is preferable that the abutting ends of the poles or timbers 17 and 18, be cut at an incline as shown in Fig. 2 of the drawings, or otherwise placed together, and that these ends be of such cross sectional area as to form a driving fit in the sockets of sleeve 10. By this arrangement it will be obvious that an end of one pole may be driven into the sockets of sleeve 10 for a suitable distance, and then the end of the other pole driven into the opposite end of said sleeve until the two pole ends meet, thus forming a rigid and effective juncture between the two poles, thereby providing a long pole.

By arranging the prongs 11 so that they will stand away from the outer surfaces of the pole member, it will be seen that a stay or guy rope may be readily inserted between the surfaces of said poles and the inner faces of said prongs, and secured to said prongs in any desired manner, and utilized for securing a tree to said pole, or for any other purpose.

Figure 4:
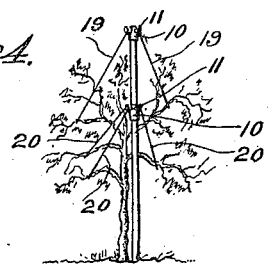
Fig. 4 is a view of a tree showing my device in position for supporting the tree limbs.

In Fig. 4 I have illustrated my device, in position to support the limbs of trees. Oftentimes fruit and other food bearing trees become so heavily laden with fruit that the limbs are accidentally broken from the trees, thereby causing destruction of the tree and entailing loss to the owner. By means of my device the tree limbs are supported in position until relieved of their load of fruit.

In utilizing my invention for the support of tree limbs, my device is preferably affixed to the upper end of a pole which is placed alongside of the tree trunk, the upper end extending upwardly and terminating adjacent the tree top, as clearly shown in Fig. 4 of the drawings. Guy wires 19 are attached to the prongs 11, formed on the upper end of the device, from thence they are attached to the various limbs of the tree that need support and which might easily become broken during the bearing period of the trees. As the guy wires extend in different directions from the prongs, it will be seen that the prop will be readily supported in an upright vertical position, without the necessity of embedding the lower end of the pole into the ground.

In large trees where there are a greater number of limbs to be supported during the fruit bearing period, a number of my devices may be mounted on the pole intermediate the ends, as illustrated in Fig. 4, the guy wires 20 supporting the lower limbs in the same manner as the wires 19 support the upper limbs of the tree.

What I claim is:

1. A pole splicer, comprising a sleeve adapted to fit snugly around the abutted ends of a pair of pole members and provided with means whereby a stay member may be attached thereto.

2. A pole splicer, comprising a sleeve adapted to fit snugly around the abutted ends of a pair of pole members and provided with a plurality of prong members on its end.

3. A pole splicer, comprising a sleeve adapted to fit snugly around the abutted ends of a pair of pole members and provided with a plurality of prongs on its end, said prongs being formed integral with said sleeve and arranged to stand away from the surface of said pole members.

4. A device of the class described, comprising an open ended sleeve member stamped from sheet metal, the side edges of said sleeve being secured together, one of the ends of said sleeve member having a plurality of cable attaching hooks formed thereon, said hooks being offset, whereby the sleeve may be mounted on a pole at any point intermediate its ends.

In witness that I claim the foregoing I have hereunto subscribed my name this 3rd day of December, 1920.

WILLIAM J. W. ORR.